Jan. 25, 1927.
F. E. EBERHARDT
1,615,537
HOBBING MACHINE
Filed Jan. 31, 1924
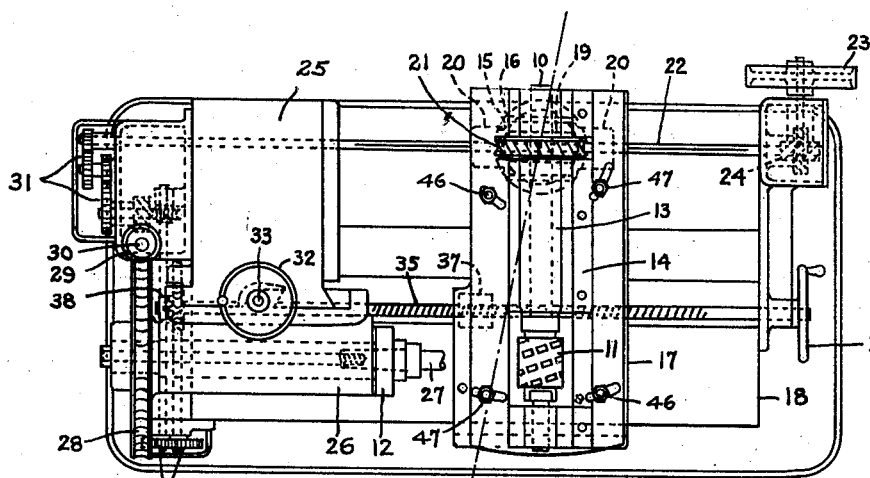
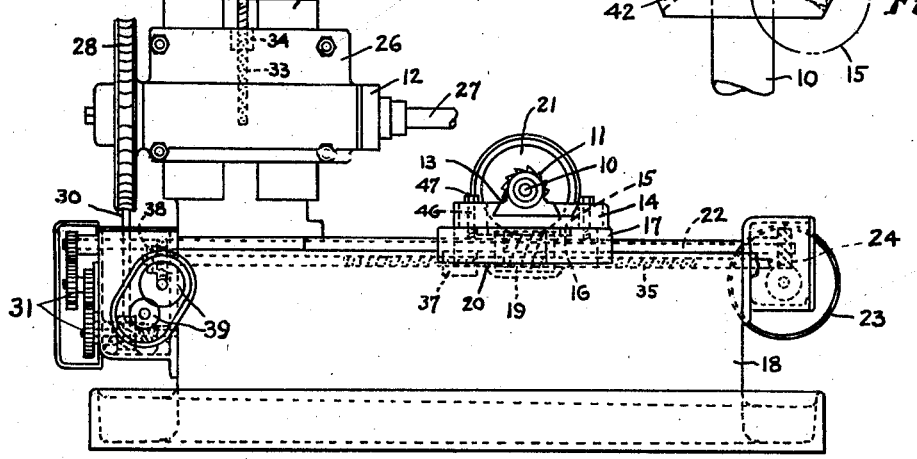
INVENTOR.
Frank E. Eberhardt.
ATTORNEY.

Patented Jan. 25, 1927.

1,615,537

UNITED STATES PATENT OFFICE.

FRANK E. EBERHARDT, OF NEWARK, NEW JERSEY, ASSIGNOR TO NEWARK GEAR CUTTING MACHINE CO., OF NEWARK, NEW JERSEY, A CORPORATION OF NEW JERSEY.

HOBBING MACHINE.

Application filed January 31, 1924. Serial No. 689,637.

The invention relates to gear hobbing machines for generating gears by the cutting action of a so-called "hob" type of cutter, and which shall be suitable for the generation of spur, helical, worm and similar forms of gears.

It has for its object to provide a gear cutting machine of this type which, without sacrificing simplicity of construction, will afford means for varying the angular adjustment of the cutter supporting spindle axis relatively to the axis of the work supporting spindle of the machine. A further object of the invention consists in effecting this result with a minimum extension of the cutter spindle supports from the main housing of the machine. A gain of rigidity results from the improved arrangement and thereby increases, also, the accuracy of the generating action of the whole machine. The productive capacity, moreover, is increased due to the heavier cutting rates made possible in that the improved construction allows for having the cutter spindle closer to its bearings than has been possible in constructions heretofore provided.

The cutting life of the hobs or cutters is also lengthened in that the cutting edges are enabled to pass thru the gear blank materials more smoothly, obviating the chattering or irregular cutting action so ruinous to the cutting edges of the hob.

In hobbing machines as commonly constructed, the cutter spindle supports have been extended far enough from the supporting frame to afford room for allowing the passage of the spindle driving gearing thru the center of the machine as well as thru the center of the cutter carriage. Also ball-jointed driving shaft connections to the cutter spindle drive have been employed in order to obviate the central drive and extended supports used therewith. A drive of this character, however, is poorly adapted to resist the torsion and heavy cutting strains incidental to the use of modern high speed tools.

In accordance with the present invention wherein simplicity of machine design is sought with the desired angular adjustment of the hob supporting spindle, use is made of a novel type of hob spindle driving gearing. This gearing is designed to allow of a predetermined range of angular adjustment, in the plane of the axes or a parallel plane, between the respective axes of a pair of driving and driven members connecting the drive shaft to the hob supporting spindle; and will thus enable the use of various diameters and pitches of hobs for generating spur gears and helical gears of various angles.

The invention admits, also, thru the small amount of angular adjustment of the hob, for compensating for hobs which are purposely made large, when new, and which then thru sharpening and wearing down attain a smaller size, thereby reducing the pitch diameter of the hob and altering its helix angle, and thus requiring a changed hob setting for each grinding. On work of precision, it is a very important consideration that the hob present the correct face to the work; and the invention provides means for obtaining the necessary slight swivel adjustment and without the use of complicated mechanism which would otherwise obtain on standard hobbing machines.

Should it be desired to exceed the predetermined range allowed by a particular combination, other combinations of spindle gearing may be substituted to accommodate a different range. In the present machine, moreover, the hob spindle drive is so arranged that it does not pass thru the center of the cutter carriage but is located exteriorly of the carriage center, enabling the spindle bearings, therefore, to be placed much closer to the main housing and reducing the shafts, gears and joints for transmitting motion between the hob supporting spindle and the work supporting spindle to a minimum.

This saving of mechanism is of great value in the particular class of gear generating machines under consideration, as the accuracy of the finished tooth or other generated contour depends directly upon the accuracy of the finish of each member in the train of constantly revolving mechanism. The less members necessary, therefore, the greater the accuracy obtainable, as will readily be appreciated by those familiar with gear generating processes.

The nature of the invention, however, will best be understood when described in connection with the accompanying drawings, in which—

Fig. 1 is a plan of the novel gear cutting machine.

Fig. 2 is a side elevation thereof.

Fig. 3 is a fragmentary plan illustrating the novel worm wheel of the driving train for the hob supporting spindle.

Fig. 4 is a similar view of a modification in the hob supporting spindle drive.

Fig. 5 is a fragmentary sectional view thru the swivel support for the hob spindle.

Similar characters of reference designate corresponding parts thruout the several views.

Referring to the drawings, the invention is shown as embodied in a hobbing machine of the type in which the hob supporting spindle 10 of a hob 11 may have a horizontal movement of translation along an axis parallel to the work supporting spindle 12 of the machine, the spindles thus being arranged transversely of each other. This type of machine is known as the "horizontal cutting type"; but it will be understood, of course, that the invention is also applicable to the "vertical cutting type" in which the translation of the hob supporting spindle is in a vertical plane. In either case and as will hereinafter be more fully set forth, the translating member is restricted to a movement parallel to the axis of the work supporting spindle.

The hob supporting spindle 10 is shown as mounted in an elongated bearing 13 affording rigidity thereto, and is axially adjustable with said bearing in a swivel slide 14, which axial adjustment allows of presenting various portions of the hob to the work. The said slide 14, furthermore, is arranged to swivel in a circular bearing 15 secured to the said slide and fitting a complementary groove 16 provided in a carriage 17. The latter is slidably mounted on the frame 18 of the machine and serves as a support for the hob bearing and its spindle and is capable of translation along the frame as will hereinafter be more fully described. The carriage 17 carries, also, a worm 19 supported in bearings 20 of the carriage and meshing with a worm wheel 21 suitably mounted near one end of the hob supporting spindle. Worm 19, furthermore, is slidably mounted on a driving shaft 22 preferably splined and which receives its power from any suitable source, as for example, a pulley 23 thru suitable intermediate gearing 24, the worm and worm wheel thus constituting a driving train for the hob supporting spindle.

A column 25 is mounted upon the frame 18 and is arranged to adjustably support a work head 26 in which the work supporting spindle 12 is rotatably mounted. A work arbor 27 is provided in connection therewith for mounting gear blanks and the like (not shown). This arbor may be driven thru a suitable driving train consisting of the master wheel 28 secured to the work spindle and a worm 29 meshing therewith, the latter being vertically movable upon a splined shaft 30, as is well understood. Intermediate change gear transmission mechanism 31 is included between the worm 29 and the drive shaft 22 to afford the desired ratio of rotational speeds of the work supporting spindle and hob supporting spindle, such speed changing and transmission mechanism being of well-known construction and forming no essential part of the present invention. The adjustment of the work head 26 may be effected in the usual manner thru a hand wheel 32, screw 33 and nut 34, the latter mounted in the head 26. Similarly, the translation of the carriage 17 may be effected manually by a screw 35 having a hand wheel 36 secured to its outer end, the screw 35 passing thru a nut 37 mounted in the carriage. When this feed is to be automatically effected, a clutch 38 is arranged in the usual manner and thru intermediate gearing 39 to connect same with the transmission 31.

The invention is concerned, however, more especially with the drive train for the hob supporting spindle and support therefor, the same being so constructed and arranged that the angular adjustment of the hob supporting spindle may be varied in a simple and ready manner without sacrificing the advantages of the simple mechanism of the machine and enable advantage to be taken of the flexible adaptability of the machine to various ratios and diameters of work. I am aware that carriages for supporting hob cutters and with but two hob supporting spindle driving gear members in the drive train therefor are known; but so far as I am aware, in all of these mechanisms, the axes of the two gears of the train have been fixed and rigid, maintaining their fixed relationship or same unit position for which the gears were originally designed and cut. When attempt has been made to afford an adjustment of the hob supporting spindle, therefore, it was necessary to provide flexible connections in the transmission of the hobbing machine shaft, such as universal joints and sliding sleeves, all of which destroy the simplicity of construction desirable and render the cutting of the gear less accurate.

In accordance with the present invention, reference being had more particularly to Fig. 3 of the drawings, the mating teeth preferably only of one of the wheels as the teeth 40 of the worm wheel 21 are so generated that they are conjugate surfaces in the nature of arcs, being narrow at the ends and thickest at the center, the degree of divergence being indicated by the broken lines, Fig. 3. This conjugating may be accomplished upon hobbing machines of the well-known type or upon the simple special type herein disclosed or by any other suitable means. It will be understood, of course, that the amount of angular adjustment possible, indicated by the broken lines, Fig. 1, with the single pair of wheels of this character is limited by considerations of tooth thickness and length. Ordinarily, the angular range would be, for example 6°—that is to say from 0° to +6°, or from +10° to +16°, or +3° to —3°, or 0° to —6°, etc. The range may be all clockwise, or counter-clockwise, from a zero angle, or include both directions. In other words, adjustment may be to the right and left as for right or left hand hobs. For some angles, different worm wheels may be employed with the same worm or the same worm wheel with different worms, the pair of wheels of the driving train thus constituting a set of change gear wheels. Moreover, the adjustment is not restricted to worm and worm wheel form of gearing, but other forms of gearing may be employed for this purpose. For example, as shown in Fig. 4, a pair of ordinary or skew bevel gear wheels 41 and 42 may be utilized, the former being slidably mounted on the drive shaft 22 and the latter on the hob supporting spindle 10. It will be understood, of course, that the teeth of one or both of these wheels are curved or modified similarly to those of the worm and worm wheel.

In either case, it is preferred to effect a swivelling action of the hob supporting spindle 10 with its hob 11 around an axis normal to the plane of engagement of the gear teeth of the driving train and lying in a plane of engagement thereof, preferably the median plane of engagement, that is to say substantially where the pitch surfaces of the gear teeth make contact.

When adjustment has been determined and the hob supporting spindle with its swivelled slide 14 set to the selected angle, the said slide is secured to its carriage as, for example, by studs 46 and nuts 47 operating thru arcuate slots whose center is located exteriorly of the frame of the hobbing machine. The subsequent operation of the hobbing, with hob supporting spindle thus adjusted, is carried on in the usual manner. It will be noted, moreover, that this desirable adjustability is attained without sacrificing simplicity of construction in that the hob spindle drive does not pass thru the center of the cutter carriage, but is located exteriorly thereof and thereby enhances the value of the hobbing machine for accurate work.

I claim:—

1. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a pair of gear wheels adjustable relatively to each other about an axis substantially perpendicular to the driving shaft, the teeth of each wheel being conjugate to those of its mate in various angular adjustments, a work supporting spindle driving train, a cutter carriage, and means to effect a relative feed between same and the work supporting spindle in the direction of the axis of the latter, the hob supporting spindle being on the carriage transversely of said work supporting spindle and angularly adjustable on the said carriage about an axis substantially perpendicular to the axis of said driving shaft.

2. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a pair of gear wheels adjustable relatively to each other and the teeth of one wheel tapering from the center to the ends, a work supporting spindle driving train, a cutter carriage, and means to effect a relative feed between same and the work supporting spindle in the direction of the axis of the latter, the hob supporting spindle being on the carriage transversely of said work supporting spindle and angularly adjustable on the said carriage.

3. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a pair of gear wheels adjustable relatively to each other and the teeth of both wheels tapering from the center to the ends, a work supporting spindle driving train, a cutter carriage, and means to effect a relative feed between same and the work supporting spindle in the direction of the axis of the latter, the hob supporting spindle being on the carriage transversely of said work supporting spindle and angularly adjustable on the said carriage.

4. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a worm and worm wheel, a work supporting spindle driving train, a cutter carriage, and means to effect a relative feed between same and the work supporting spindle in the direction of the axis of the latter, the hob supporting spindle being on the carriage transversely of said work supporting spindle and angularly adjustable on the said carriage about an axis at right angles to the work spindle axis.

5. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a pair of gear wheels, one of which has its teeth so modified as to permit of a predetermined range of angular movement in a plane of the axes thereof or plane parallel thereto, a work supporting spindle driving train, a cutter carriage, and means to effect a relative feed between same and the work supporting spindle in the direction of the axis of the latter, the hob supporting spindle being on the carriage transversely of said work supporting spindle.

6. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a worm and worm wheel having their teeth so modified as to permit of a predetermined range of angular movement of same with respect to the worm, a work supporting spindle driving train, a cutter carriage, and means to effect a relative feed between same and the work supporting spindle in the direction of the axis of the latter, the hob supporting spindle being on the carriage transversely of said work supporting spindle.

7. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a worm and worm wheel, the latter having its teeth so modified as to permit of a predetermined range of angular movement of same with respect to the worm about an axis normal to the plane of adjustment and lying in a plane of engagement of the teeth, a work supporting spindle driving train, a cutter carriage, and means to effect a relative feed between same and the work supporting spindle in the direction of the axis of the latter, the hob supporting spindle being on the carriage transversely of said work supporting spindle.

8. In a hobbing machine: a frame, a hob supporting spindle and a work supporting spindle rotatably mounted thereon transversely of each other, a rotatable driving shaft secured parallel to the work supporting spindle and forming one member of a transmission connecting said spindles, said transmission including a hob supporting spindle driving train consisting of a worm and worm wheel, the latter having its teeth so modified as to permit of a predetermined range of angular movement of same with respect to the worm, about an axis normal to the plane of adjustment and lying in the median plane of engagement of the teeth, a work supporting spindle driving train, a cutter carriage, and means to effect a relative feed between same and the work supporting spindle in the direction of the axis of the latter, the hob supporting spindle being on the carriage transversely of said work supporting spindle.

9. In a hobbing machine: a frame, a hob supporting spindle and a work supporting spindle rotatably mounted thereon transversely of each other, a rotatable and splined driving shaft secured parallel to the axis of the work supporting spindle and forming one member of a transmission connecting said spindles, a work supporting spindle driving train, a cutter carriage, and means to effect a relative feed between same and the work supporting spindle in the direction of the axis of the latter, the hob supporting spindle being on the carriage transversely of said work supporting spindle, a worm mounted on the carriage slidably keyed to said splined driving shaft, a worm wheel mounted on said hob supporting spindle, meshing with said worm and having its teeth so modified as to permit of a predetermined range of angular movement of same with respect to the work supporting spindle.

10. In a hobbing machine: a frame, a hob supporting spindle and a work supporting spindle rotatably mounted thereon transversely of each other, a rotatable and splined driving shaft secured parallel to the axis of the work supporting spindle and forming one member of a tranmission connecting said spindles, a work supporting spindle driving train, a cutter carriage, and means to effect a relative feed between same and the work supporting spindle in the direction of the axis of the latter, the hob supporting spindle being on the carriage transversely of said work supporting spindle, a bearing for the hob supporting spindle and a circular bearing for the first-named bearing in said carriage, means to secure the spindle bearing to the carriage, a worm mounted on the carriage and slidably keyed to said splined driving shaft, a worm wheel mounted on said hob supporting spindle, meshing with said worm and having its teeth so modified as to permit of a predetermined range of angular movement of same with respect to the work supporting spindle.

Signed at Newark, in the county of Essex and State of New Jersey, this 28th day of January A. D. 1924.

FRANK E. EBERHARDT.